United States Patent
Yoo et al.

(10) Patent No.: US 11,114,658 B2
(45) Date of Patent: Sep. 7, 2021

(54) POSITIVE ACTIVE MATERIAL FOR RECHARGEABLE LITHIUM BATTERY, POSITIVE ELECTRODE INCLUDING SAME AND RECHARGEABLE LITHIUM BATTERY INCLUDING SAME

(71) Applicant: Samsung SDI Co., Ltd., Yongin-si (KR)

(72) Inventors: Heeeun Yoo, Yongin-si (KR); Junghyun Nam, Yongin-si (KR); Hoon Seok, Yongin-si (KR); Yeonhee Yoon, Yongin-si (KR); Kyuseo Lee, Yongin-si (KR); Bokkyu Jeon, Yongin-si (KR); Jaehwan Ha, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 78 days.

(21) Appl. No.: 16/279,306

(22) Filed: Feb. 19, 2019

(65) Prior Publication Data

US 2019/0260017 A1    Aug. 22, 2019

(30) Foreign Application Priority Data

Feb. 19, 2018    (KR) ........................ 10-2018-0019345

(51) Int. Cl.
     *H01M 4/36*      (2006.01)
     *H01M 4/505*      (2010.01)
     (Continued)

(52) U.S. Cl.
     CPC ............ *H01M 4/366* (2013.01); *H01M 4/131* (2013.01); *H01M 4/136* (2013.01); *H01M 4/364* (2013.01);
     (Continued)

(58) Field of Classification Search
     CPC ...... H01M 4/364; H01M 4/366; H01M 4/131; H01M 4/0404
     See application file for complete search history.

(56) References Cited

U.S. PATENT DOCUMENTS

2006/0099495 A1    5/2006    Suzuki et al.
2011/0020703 A1*    1/2011    Suzuki ................ H01M 4/1397
                                                                    429/221
(Continued)

FOREIGN PATENT DOCUMENTS

JP      2006-134770 A      5/2006
JP      2007026676 A *      2/2007      ............ H01M 4/366
(Continued)

OTHER PUBLICATIONS

Machine translation of KR 2009-0008870 (no date).*
(Continued)

*Primary Examiner* — Amanda C. Walke
(74) *Attorney, Agent, or Firm* — Lewis Roca Rothgerber Christie LLP

(57) ABSTRACT

Provided are a positive active material for a rechargeable lithium battery and a positive electrode including the same. The positive active material for a rechargeable lithium battery includes a first positive active material and a second positive active material, wherein the first positive active material includes at least one nickel-based lithium composite oxide, and the second positive active material is represented by Chemical Formula 2 and has an average particle diameter of about 300 nm to about 600 nm:

$Li_{a1}Fe_{1-x1}M1_{x1}PO_4$.      [Chemical Formula 2]

In Chemical Formula 2, $0.90 \leq a1 \leq 1.8$, $0 \leq x1 \leq 0.7$, and M1 may be Mg, Co, Ni, or a combination thereof.

15 Claims, 4 Drawing Sheets

(51) Int. Cl.
| | |
|---|---|
| *H01M 4/525* | (2010.01) |
| *H01M 4/58* | (2010.01) |
| *H01M 10/0525* | (2010.01) |
| *H01M 4/136* | (2010.01) |
| *H01M 10/42* | (2006.01) |
| *H01M 4/62* | (2006.01) |
| *H01M 4/131* | (2010.01) |
| *H01M 4/02* | (2006.01) |
| *H01M 10/052* | (2010.01) |

(52) U.S. Cl.
CPC .......... *H01M 4/505* (2013.01); *H01M 4/525* (2013.01); *H01M 4/5825* (2013.01); *H01M 4/622* (2013.01); *H01M 10/0525* (2013.01); *H01M 10/4235* (2013.01); *H01M 10/052* (2013.01); *H01M 2004/028* (2013.01); *H01M 2200/00* (2013.01)

(56) References Cited

U.S. PATENT DOCUMENTS

| | | |
|---|---|---|
| 2012/0231341 A1 | 9/2012 | Kim et al. |
| 2015/0050533 A1 | 2/2015 | Nam et al. |
| 2017/0033344 A1 | 2/2017 | Suzuki |
| 2017/0309898 A1 | 10/2017 | Hong |
| 2018/0026260 A1* | 1/2018 | Hoshina ................. H01M 4/131 429/61 |
| 2018/0108940 A1* | 4/2018 | Kwon ............... H01M 10/0525 |

FOREIGN PATENT DOCUMENTS

| | | | |
|---|---|---|---|
| JP | 2014-192143 A | | 10/2014 |
| KR | 20090008870 A | * | 1/2009 |
| KR | 10-2012-0053880 A | | 5/2012 |
| KR | 10-2012-0104484 A | | 9/2012 |
| KR | 10-2014-0070259 A | | 6/2014 |
| KR | 10-2015-0020022 A | | 2/2015 |
| KR | 10-2016-0041496 A | | 4/2016 |
| KR | 10-2016-0075196 A | | 6/2016 |
| KR | 10-2016-0080244 A | | 7/2016 |
| KR | 10-2018-0045724 A | | 5/2018 |
| KR | 10-2018-0049986 A | | 5/2018 |
| WO | WO 2012/090804 A1 | | 7/2012 |

OTHER PUBLICATIONS

Machine translation of JP 2007-026676 (no date).*
Machine translation of JP 2014-192143 (no date).*
Machine translation of WO 2012/090804 (no date).*
EPO Extended Search Report dated Jun. 18, 2019, for corresponding European Patent Application No. 19157415.1 (7 pages).
European Patent Office Action for corresponding European Patent Application No. 19 157 415.1, dated Jan. 30, 2020, 5 pages.
Korean Intellectual Property Office Action for corresponding Korean Application No. 10-2018-0019345, dated Jun. 29, 2020, 6 pages.

* cited by examiner

POSITIVE ACTIVE MATERIAL FOR RECHARGEABLE LITHIUM BATTERY, POSITIVE ELECTRODE INCLUDING SAME AND RECHARGEABLE LITHIUM BATTERY INCLUDING SAME

CROSS-REFERENCE TO RELATED APPLICATION

This application claims priority to and the benefit of Korean Patent Application No. 10-2018-0019345 filed in the Korean Intellectual Property Office on Feb. 19, 2018, the entire content of which is incorporated herein by reference.

BACKGROUND

1. Field

One or more aspects of example embodiments of the present disclosure are related to a positive active material for a rechargeable lithium battery, a positive electrode including the same, and a rechargeable lithium battery including the same.

2. Description of the Related Art

Portable information devices (such as cell phones, laptops, smart phones, and/or the like) and electric vehicles have used rechargeable lithium batteries having high energy density and easy portability as a driving power source.

In general, rechargeable lithium batteries are manufactured using materials capable of reversibly intercalating and deintercalating lithium ions as positive active materials and negative active materials, and filling an electrolyte between a positive electrode and a negative electrode including the positive active material and the negative active material, respectively.

As rechargeable lithium battery are applied to an increasing number of fields, research on improving the performance of the positive active material and positive electrodes including the positive active material has been performed to develop rechargeable lithium batteries having improved battery characteristics even under high temperatures and/or high voltages.

SUMMARY

One or more aspects of example embodiments of the present disclosure are directed toward a positive active material for a rechargeable lithium battery having improved thermal stability and improved cycle-life characteristics, and a positive electrode and a rechargeable lithium battery including the same.

One or more example embodiments of the present disclosure provide a positive active material for a rechargeable lithium battery including a first positive active material and a second positive active material, wherein the first positive active material includes at least one nickel-based lithium composite oxide, and the second positive active material is represented by Chemical Formula 2 and has an average particle diameter of about 300 nm to about 600 nm.

Chemical Formula 2

In Chemical Formula 2, $0.90 \leq a1 \leq 1.8$, $0 \leq x1 \leq 0.7$, and M1 may be magnesium (Mg), cobalt (Co), nickel (Ni), or a combination thereof.

One or more example embodiments of the present disclosure provide a positive electrode for a rechargeable lithium battery including a current collector and a positive active material layer on at least one surface of the current collector, wherein the positive active material layer includes the positive active material for a rechargeable lithium battery according to embodiments of the present disclosure.

One or more example embodiments of the present disclosure provide a rechargeable lithium battery including the positive electrode for a rechargeable lithium battery according to embodiments of the present disclosure, a negative electrode, and an electrolyte solution.

One or more example embodiments of the present disclosure provide a positive active material for a rechargeable lithium battery with excellent capacity by way of significantly reducing the sheet resistance, and/or with excellent thermal stability by way of using a positive active material having excellent heat resistance.

The positive electrode including a positive active material according to embodiments of the present disclosure may enable a rechargeable lithium battery having excellent capacity, improved cycle-life characteristics, and/or excellent thermal stability.

BRIEF DESCRIPTION OF THE DRAWINGS

The accompanying drawings, together with the specification, illustrate embodiments of the subject matter of the present disclosure and serve to explain principles of embodiments of the present disclosure.

DETAILED DESCRIPTION

Hereinafter, the present disclosure will be described more fully with reference to the accompanying drawings, in which example embodiments of the present disclosure are shown. The described embodiments may be modified in various ways without departing from the spirit or scope of the present disclosure. In this regard, the present example embodiments may have different forms and should not be construed as being limited to the descriptions set forth herein. Accordingly, the example embodiments are merely described below, by referring to the drawings, to explain aspects of the present description.

The drawings and description are to be regarded as illustrative in nature and not restrictive. Like reference numerals designate like elements throughout the specification, and duplicative descriptions thereof may not be provided.

Sizes and thicknesses of components in the drawings are arbitrarily expressed for convenience of description and, thus, the present disclosure is not limited by the drawings. For example, the thicknesses of layers, films, panels, regions, etc., may be exaggerated for clarity. It will be understood that when an element such as a layer, film, region, or substrate is referred to as being "on" another element, it can be directly on the other element or intervening element(s) may also be present. In contrast, when an element is referred to as being "directly on" another element, no intervening elements are present.

In addition, unless explicitly described to the contrary, the word "comprise" and variations such as "comprises" or "comprising" will be understood to imply the inclusion of stated elements but not the exclusion of any other elements. Expressions such as "at least one of", "one of", and "selected from", when preceding a list of elements, modify the entire list of elements and do not modify the individual elements of the list. Further, the use of "may" when describing embodiments of the present disclosure refers to "one or more embodiments of the present disclosure."

A positive active material for a rechargeable lithium battery according to embodiments of this disclosure may include a first positive active material and a second positive active material.

The first positive active material may include at least one nickel-based lithium composite oxide. For example, the first positive active material may include at least one of a first nickel-based lithium composite oxide and a second nickel-based lithium composite oxide. In some embodiments, the first positive active material may include at least two nickel-based lithium composite oxides having a different average particle diameter.

One or more embodiments of the present disclosure may include the first positive active material including the first nickel-based lithium composite oxide, in addition to the second positive active material.

The first positive active material may include a first nickel-based lithium composite oxide.

The first nickel-based lithium composite oxide may include any compound (lithiated intercalation compound) capable of intercalating and deintercalating lithium. For example, one or more composite oxides including lithium and a metal selected from cobalt, manganese, nickel, and a combination thereof may be used. Non-limiting examples may be represented by one of the following chemical formulae: $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); and $LiNiVO_4$; $Li_{(3-f)}J_2(PO_4)_3$ ($0 \leq f \leq 2$).

In the above chemical formulae, A may be selected from nickel (Ni), cobalt (Co), manganese (Mn), and a combination thereof; X may be selected from aluminum (Al), Ni, Co, Mn, chromium (Cr), iron (Fe), magnesium (Mg), strontium (Sr), vanadium (V), a rare earth element, and a combination thereof; D may be selected from oxygen (O), fluorine (F), sulfur (S), phosphorus (P), and a combination thereof; E may be selected from Co, Mn, and a combination thereof; T may be selected from F, S, P, and a combination thereof; G may be selected from Al, Cr, Mn, Fe, Mg, lanthanum (La), cerium (Ce), Sr, V, and a combination thereof; Z may be selected from Cr, V, Fe, Sc, yttrium (Y), and a combination thereof; and J may be selected from V, Cr, Mn, Co, Ni, copper (Cu), and a combination thereof.

The first nickel-based lithium composite oxide may have a coating layer on the surface, and/or may be mixed with another nickel-based lithium composite oxide having a coating layer.

The coating layer may include at least one compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, potassium (K), sodium (Na), calcium (Ca), silicon (Si), Ti, V, tin (Sn), germanium (Ge), gallium (Ga), boron (B), arsenic (As), zirconium (Zr), or a mixture thereof. The coating layer may be applied using any suitable method, for example, a method that does not adversely influence the properties of the positive active material. Non-limiting examples of suitable methods available in the art may include spray coating, dipping, etc.

The first nickel-based lithium composite oxide may include a compound represented by Chemical Formula 1.

$$Li_{a2}(Ni_{1-x2-y-z}Co_{x2}Me_yM2_z)O_2. \qquad \text{Chemical Formula 1}$$

In Chemical Formula 1, M2 may be an element selected from boron (B), magnesium (Mg), calcium (Ca), strontium (Sr), barium (Ba), titanium (Ti), vanadium (V), chromium (Cr), iron (Fe), copper (Cu), and zirconium (Zr), $0.95 \leq a2 \leq 1.3$, $x2 < (1-x2-y-z)$, $y < (1-x2-y-z)$, $0 < x2 < 1$, $0 \leq y < 1$, $0 \leq z < 1$, and Me may be at least one of Mn and Al. In the compounds of Chemical Formula 1, the nickel content may be higher than the cobalt content, and the nickel content may be higher than the manganese (or aluminum) content.

In Chemical Formula 1, a2 may be $0.95 \leq a2 \leq 1.3$, for example, $1.0 \leq a2 \leq 1.1$. x2 may be $0 < x2 \leq 0.33$, for example, $0.1 \leq x2 \leq 0.33$. y may be $0 \leq y \leq 0.5$, for example, $0.05 \leq y \leq 0.3$, and z may be $0 \leq z \leq 0.05$. In Chemical Formula 1, x2, y, and z may satisfy $0.33 \leq (1-x2-y-z)$ $0.95$. For example, z, x2, and y may satisfy $0.5$ $z \leq 0.05$, $0 < x2 \leq 0.33$, and $0 \leq y \leq 0.33$.

In one or more embodiments of the present disclosure, z may be zero (0) in Chemical Formula 1.

In the nickel-based lithium composite oxide including the compound represented by Chemical Formula 1, the nickel content may be about 0.33 mol % to about 0.95 mol % based on the total amount of transition metals (Ni, Co, Mn), and may be higher than the manganese content and the cobalt content. In the nickel-based lithium composite oxide, the nickel content may be higher than each of the other transition metals based on a total of 1 mole of all transition metals. When the positive active material including the nickel-based lithium composite oxide includes a large (e.g., relatively large) amount of nickel, the rechargeable lithium battery employing the positive electrode including the same may have a high degree of lithium diffusion, excellent conductivity, and a higher capacity at the same voltage (e.g., within the same operating voltage range).

In some embodiments, the first nickel-based lithium composite oxide may include a compound represented by at least one of $LiNi_{0.6}Co_{0.2}Mn_{0.2}O_2$, $LiNi_{0.5}Co_{0.2}Mn_{0.3}O_2$, $LiNi_{0.33}Co_{0.33}Mn_{0.33}O_2$, $LiNi_{0.8}Co_{0.1}Mn_{0.1}O_2$, $LiNi_{0.85}Co_{0.1}Al_{0.05}O_2$, and $LiNi_{0.95}Co_{0.025}Al_{0.025}O_2$.

In some embodiments, the amount of the first positive active material may be about 70 wt % to about 99 wt %, for example, about 85 wt % to about 99 wt %, about 87 wt % to about 95 wt %, or about 90 wt % to about 98 wt % based on the total positive active material. When the amount of the first positive active material is within this range, safety may be improved without deteriorating the capacity.

The first positive active material may have an average particle diameter of about 1 μm to about 25 μm. For example, the average particle diameter of the first positive active material may be about 1 μm to about 20 μm, or about 2 μm to about 16 μm. In some embodiments, the average particle diameter of the first positive active material may be about 8 μm to about 15 μm, or about 1 μm to about 5 μm. When the average particle diameter of the first positive active material is within this range, and the positive active material is mixed with the second positive active material on the positive electrode, the active mass density may be remarkably increased, and thus the rechargeable lithium battery may have an increased capacity.

Next, the second positive active material is described.

The second positive active material may be represented by Chemical Formula 2.

Chemical Formula 2

In Chemical Formula 2, 0.90≤a1≤1.8, 0≤x1≤0.7, and M1 may be Mg, Co, Ni, or a combination thereof.

The second positive active material may have an average particle diameter of, for example, about 300 nm to about 600 nm. When the average particle diameter of the second positive active material satisfies this range, and the positive active material is mixed with the first positive active material on the positive electrode, the active mass density may be remarkably increased, and thus the rechargeable lithium battery may have an increased capacity. In the present specification, the term "average particle diameter of the second positive active material" refers to an average diameter of the second positive active material when the second positive active material is circular, or an average of the long (e.g., longer) diameter when the second positive active material is oval or amorphous. Particle size analysis may be performed according to international standards, for example, using Small-Angle X-ray Scattering (SAXS).

An amount of the second positive active material may be about 1 wt % to about 15 wt %, for example, about 2 wt % to about 15 wt %, about 2 wt % to about 12 wt %, or about 2 wt % to about 10 wt % based on a total amount of the positive active material for a rechargeable lithium battery. When the amount of the second positive active material satisfies the range, safety may be improved without reducing the capacity.

An embodiment of the present disclosure including a first positive active material including a second nickel-based lithium composite oxide and a second positive active material is described.

The present embodiment is substantially same as the positive active material according to an embodiment of the present disclosure, except that the first positive active material includes the second nickel-based lithium composite oxide including a secondary particle having at least partially radial-shaped alignment structure. The substantially identical constituent elements may be the same as described above, and the first positive active material including the second nickel-based lithium composite oxide including the secondary particle having an at least partially radial-shaped alignment structure will be described in more detail.

The first positive active material including the second nickel-based lithium composite oxide will be described in more detail with references to FIGS. 1 to 3.

Figure 1A:
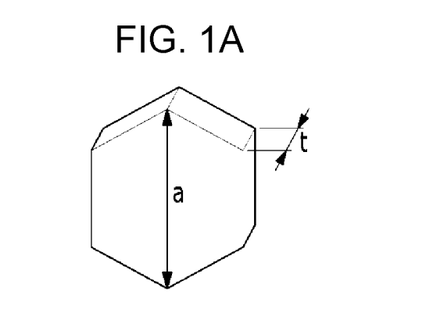
FIGS. 1A-1C are schematic views showing shapes of plate particles.
Figure 1B:
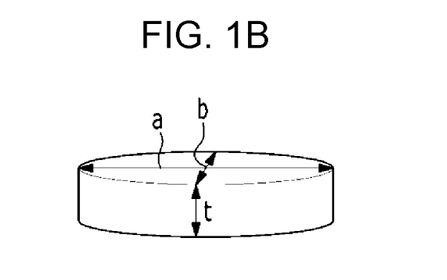
Figure 1C:
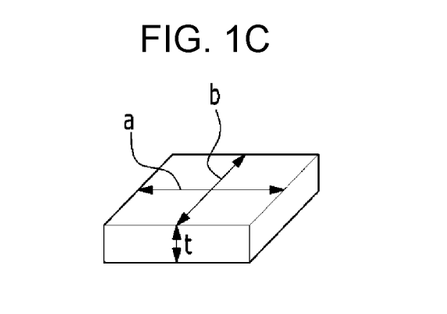
Figure 2:
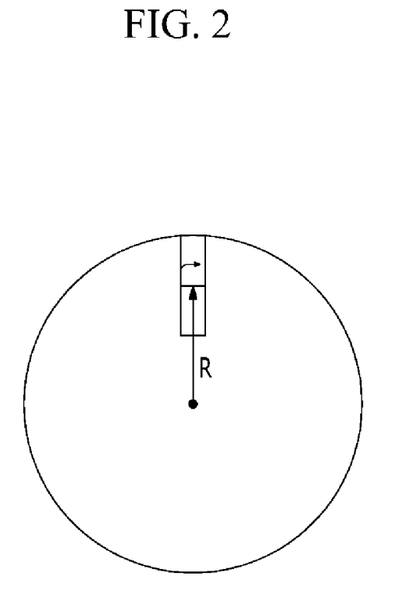
FIG. 2 schematically illustrates a definition of a radial shape in a secondary particle of a second nickel-based lithium composite oxide.

FIGS. 1A-1C are schematic drawings of plate particle shapes, and FIG. 2 illustrates a definition of a radial shape in the secondary particle of the nickel-based lithium composite oxide. FIG. 3 is a schematic drawing of a structure of the second nickel-based lithium composite oxide.

In some embodiments, the first positive active material may include a second nickel-based lithium composite oxide including the secondary particle having at least one part of radial-shaped alignment structure.

The second nickel-based lithium composite oxide may include a secondary particle including an agglomerated plurality of primary particles. The secondary particle may include an external part having a radial-shaped alignment structure and an internal part having an irregular porous structure. The internal part of the secondary particle may have a pore size larger than the external part.

The particle size of the primary particle may have a size that is small enough to improve the characteristics of the nickel-based lithium composite oxide. For example, the particle size may be about 0.01 μm to about 1 μm, for example, about 0.05 μm to about 1 μm. For example, the particle size may be about 0.05 μm to about 0.5 μm.

The internal part pore size may be about 150 nm to about 1 μm, for example, about 150 nm to about 550 nm, or about 200 nm to about 500 nm. The external part pore size may be less than about 150 nm, for example, less than or equal to about 100 nm or about 20 nm to about 90 nm. When the internal part pore size is larger than the external part pore size, the lithium diffusion distance may be shortened, and the volume change during charge and discharge may be alleviated while not exposing (or reducing exposure of) pores to the electrolyte.

The term "pore size" may refer to an average pore diameter when the pore is spherical or circular, or may refer to an long axis length when the pore is oval. The term "external" (e.g., as in "external part") may refer to a region (e.g., of the particle) within about 30 length % to about 50 length % from the outermost surface, for example, within about 40 length % from the outermost surface with respect to the distance from the center of the nickel-based composite oxide to the surface (e.g., of the secondary particle), or in some embodiments, may refer to a region within about 2 μm from the outermost surface of the nickel-based lithium composite oxide. The term "internal" (e.g., as in "internal part") may refer to a region within about 50 length % to about 70 length % from the center, for example, within about 60 length % from the center with respect to the distance from the center of the nickel-based lithium composite oxide to the surface, or in some embodiments may refer to a region excluding the region within about 2 μm from the outermost surface in the nickel-based lithium composite oxide.

The secondary particle may include an open pore in the center of the internal part with a size of less than about 150 nm, for example, about 25 nm to about 148 nm. The open pore may be an exposed pore into which the electrolyte solution may flow in and out. In some embodiments, the open pore may be formed at a depth of about 150 nm, for example, about 0.001 nm to about 100 nm or about 1 nm to about 50 nm, on average, from the surface of the nickel-based lithium composite oxide secondary particle.

In some embodiments, the nickel-based lithium composite oxide may include plate particles, and a long axis of the plate particle may be arranged in a radial direction. In this case, the crystal plane (plane vertical to (001)) through which lithium diffuses in and out of the particles may be exposed to the surface of the secondary particle.

The terms "plate particle" and "plate primary particle" refers to a particle in which the thickness of the plate particle is smaller than the long axis length (in the plane direction).

The long axis length is the longest length based on the widest surface of the plate particle.

For example, when "t" refers to a length or thickness in one axis direction of the plate particle (which is a length or dimension in a thickness direction), and "a" refers to a length in the other axis direction (which is a length of the long axis within a plane direction), the plate particle has a structure in which t is less (e.g., shorter) than a.

Referring to FIGS. 1A-1C, the plate particle may have a polygonal nano sheet shape, such as a hexagonal shape as shown in FIG. 1A, a nano disk shape as shown in FIG. 1B, or a direct hexahedral shape as shown in FIG. 1C. In FIGS. 1A-1C, the thickness t of the plate particle is smaller than the lengths a and b within the plane direction. Regarding the lengths within the plane direction, a may be longer than b, or a and b may be the same. In the plate particle, the thickness t defines the thickness direction, and the lengths a and b define the plane direction.

Referring to FIG. 2, the term "radial" in the present specification indicates that the plate particle is positioned or arranged so that a thickness (t) direction ((001) direction) is substantially perpendicular or within +5° of being perpendicular to a radial direction (R), where R is defined as pointing toward the center of the secondary particle.

The second nickel-based lithium composite oxide may have irregular porous pores in the internal part. The term "irregular porous structure" refers to a structure having pores in which the pore size and shape are neither regular nor uniform (e.g., substantially uniform).

The internal part having the irregular porous structure may include plate particles, similar to the external part. The plate particles may be irregularly arranged, unlike the external part.

An average length of the plate particles in the internal part and the external part of the secondary particle may be about 150 nm to about 500 nm, for example, about 200 nm to about 380 nm, or about 290 nm to about 360 nm. The term "average length" refers to the average of the average long axis length and the average short axis length in a plane direction of the plate particle.

The average thickness of the plate particle in the internal part and the external part of the secondary particle may be about 100 nm to about 200 nm, for example, about 120 nm to about 180 nm, or about 130 nm to about 150 nm. A ratio of the average thickness and the average length may be about 1:2 to about 1:5, for example, about 1:2 to about 1:3. When the average length, the average thickness, and the ratio of the average thickness and the average length satisfy these ranges, and when the primary particles are small sized plate particles that are radially arranged in the external part, the rechargeable lithium battery according to embodiments of the present disclosure may provide high initial efficiency and capacity. Without being bound by any theory or explanation, this is thought to be because a relatively large area of crystalline surfaces along grain boundaries in the second nickel-based lithium composite oxide having the above structure increases the paths of lithium diffusion so that lithium may be delivered to the external part, and lithium diffusion may be improved (e.g., the lithium diffusion constant may be increased).

When the plate primary particles are radially arranged, pores exposed at the surface therebetween are also facing toward the center direction (e.g., pores may connect the surface of the secondary particle with the center of the secondary particle, so as to accelerate lithium diffusion from the surface. When the primary particles are radially arranged so that pores are present in the 001 direction, which is a direction of particle expansion when lithium is intercalated, the particle may uniformly (e.g., substantially uniformly) contract and expand when lithium is intercalated and deintercalated, thereby performing a buffering action. When the plate primary particle has a small size, the risk of cracking during contraction and expansion (charge and discharge) may be reduced, and as the inner pores further alleviate the volume change, the risk of cracking may be further reduced, such that the rechargeable lithium battery including the positive electrode including the positive active material according to embodiments of the present disclosure may have improved cycle-life characteristics and reduced resistance increase.

In the second nickel-based lithium composite oxide, the inner pore size may be about 150 nm to about 550 nm, and the outer pore size may be less than about 150 nm.

Closed pores may be present in the internal part of the second nickel-based lithium composite oxide, and closed pores and/or open pores may be present in the external part. An electrolyte and/or the like may be hardly included in (e.g., mostly excluded from) the closed pores, but may be included in the open pores. A closed pore may be considered to be an independent pore, in that the walls of a closed pore are closed and the pore is not connected to other pores; while an open pore may be called a continuous (substantially continuous) pore in that at least a portion of the walls is open and the pore is connected with the external part of the particle. The secondary particle may have open pores having a size of less than about 150 nm toward the center of the internal part.

The total porosity of the first positive active material including the second nickel-based lithium composite oxide according to embodiments of the present disclosure may be about 1% to about 8%, for example, about 1.5% to about 7.5%. In the second nickel-based lithium composite oxide, the porosity of the external part may be less than the porosity of the internal part. Pores exposed to the surface of the particle may face (e.g., extend) in a direction toward the center of the internal part, and may have a size of less than about 150 nm, for example, about 10 to about 100 nm when viewed from the surface. The porosity of the internal part may be about 2% to about 20%, and the closed porosity of the external part may be about 0.1% to about 2%. The term "closed porosity" refers to the percentage of volume attributed to closed pores (pores that may not be permeated by electrolyte solution) with respect to the total volume of the pores. The porosity, or pore percentage, refers to the ratio of an area (volume) of the pores with respect to the entire area (volume) of the particle. The second nickel-based lithium composite oxide may have an internal porosity (pore percentage) of about 3.3% to about 16.5% and an external porosity (pore percentage) of about 0.3% to about 0.7%.

Hereinafter, a structure of the first positive active material including the second nickel-based lithium composite oxide according to one or more embodiments of the present disclosure will be described with reference to FIG. 3.

Figure 3:
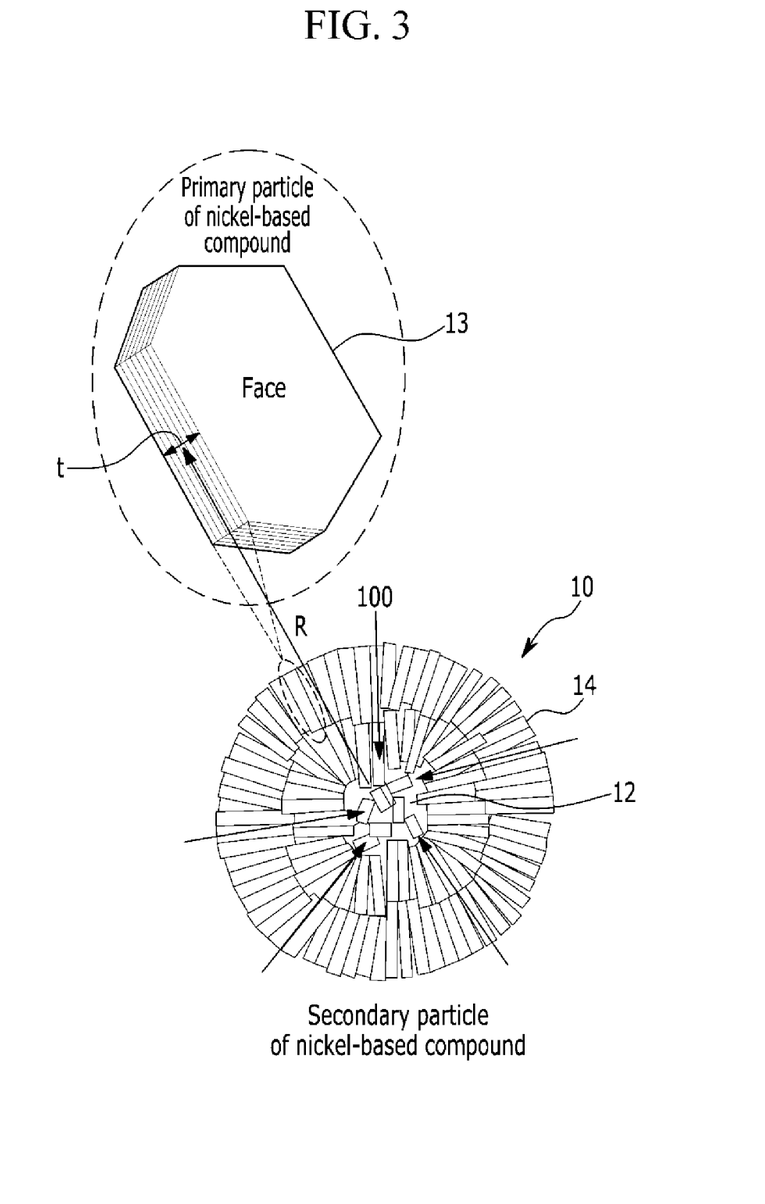
FIG. 3 schematically illustrates a structure of a second nickel-based lithium composite oxide.

As shown in FIG. 3, the first positive active material may include a primary particle 13 and a secondary particle 10, and may contain an external part 14 having a structure in which the primary particles 13 are radially arranged and an internal part 12 having a structure in which the plate particles are irregularly arranged. A larger volume of empty space between plate particles may be present in the internal part 12 compared to the external part. The pore size and porosity in the internal part may each be larger and more irregular than in the external part. In FIG. 3, the arrow 100 refers to a direction of Li ion transfer (e.g., diffusion). The primary particle 13 may have a plate shape. FIG. 3 shows only one example of the first positive active material, but the structure of the positive active material according to embodiments of the present disclosure are not limited thereto. The first positive active material including radial plate particles may support lithium diffusion and suppress or reduce stress caused by changes in volume during lithium charge and discharge, thereby suppressing or reducing cracks. The first positive active material including radial plate particles may also reduce the sheet resistance layer and have a greater active surface area for lithium diffusion.

The first positive active material may be or have a form including plate particles having a long and radial shape in a long axis in the external part, and short and flat plate particles having a length of about 150 nm to about 200 nm, and for example, nanodisk-shaped particles in the internal part.

The first positive active material may include radial-shaped plate particles and non-radial-shaped plate particles as primary particles. An amount of the non-radial plate particles may be less than or equal to about 20 wt %, for example, about 0.01 to about 10 wt %, or about 0.1 to about 5 wt % based on 100 parts by weight of the total weight of the radial plate particles and non-radial plate particles. When the non-radial plate particles besides the radial plate particles are included within the range in the second nickel-based lithium composite oxide, lithium may be easily diffused to provide a rechargeable lithium battery with improved cycle-life characteristics.

The second nickel-based lithium composite oxide may be represented by Chemical Formula 1, similar to the first nickel-based lithium composite oxide, and the second nickel-based composite oxide may be, for example, represented by at least one of $LiNi_{0.6}Co_{0.2}Mn_{0.2}O_2$, $LiNi_{0.5}Co_{0.2}Mn_{0.3}O_2$, $LiNi_{0.33}Co_{0.33}Mn_{0.33}O_2$, $LiNi_{0.8}Co_{0.1}Mn_{0.1}O_2$, $LiNi_{0.85}Co_{0.1}Al_{0.05}O_2$, and $LiNi_{0.95}Co_{0.025}Al_{0.025}O_2$.

Hereinafter, additional example embodiments of the present disclosure are described, including a first positive active material including at least two kinds of positive active materials having different average diameters, and a second active material.

In some embodiments, the positive active material may be substantially the same as described above, except that the first positive active material may include at least two kinds of positive active materials having different average particle diameters. Hereinafter, the first positive active material including at least two kinds of positive active materials having different average particle diameters will be described in more detail.

The first positive active material may include a positive active material having at least two kinds of positive active materials having different average particle diameters. For example, it may include at least one large-sized positive active material and at least one small-sized positive active material. The large-sized positive active material may have an average particle diameter of about 7 μm to about 15 μm, for example, about 10 μm to about 13 μm. The small-sized positive active material may have an average particle diameter of about 1 μm to about 5 μm, for example, about 2 μm to about 4 μm. When the first positive active material includes the large-sized and the small-sized positive active material having the average particle diameters as in above, it may further improve the capacity of the rechargeable lithium battery including the same.

The first positive active material may include a mixture in which the large-sized and the small-sized positive active materials are mixed at a weight ratio of about 9:1 to about 6:4, for example, about 9:1 to about 7:3. When the weight ratio of the large sized and the small sized positive active materials in the mixture is within this range, the rechargeable lithium battery may have excellent cycle-life characteristics and excellent capacity. In the present specification, the term "average particle diameter of the active material" refers to an average diameter of the active material when the active material is circular, or an average of the long diameter when the active material is oval or amorphous.

The large-sized positive active material and the small-sized positive active material may each be or include at least one of the first nickel-based lithium composite oxide and the second nickel-based lithium composite oxide described in the above-mentioned embodiments.

The positive electrode for a rechargeable lithium battery according to an embodiment of the present disclosure may include a current collector and a positive active material layer on at least one surface of the current collector. The positive active material layer may include a positive active material for a rechargeable lithium battery according to above embodiments.

The positive electrode may be obtained by, for example, coating a slurry of the positive active material composition on a current collector, and drying and pressing the same to provide a positive active material layer.

An average thickness of the positive active material layer may be about 50 μm to about 70 μm, for example, about 50 μm to about 60 μm, or about 60 μm to about 70 μm. When the thickness of the positive active material layer is within this range, an energy density may be increased, and this thickness may be applied to various suitable kinds or types of batteries according to the aspects of devices to be employed.

The positive active material may be included in an amount of about 90 wt % to about 98 wt % based on the total weight of the positive active material layer.

In some embodiments, the positive active material layer may include a binder and a conductive material. The binder and the conductive material may each be included in an amount of about 1 wt % to about 5 wt %, based on the total amount of the positive active material layer.

The binder may improve the binding properties of positive active material particles with one another and with the current collector. Non-limiting examples of the binder may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but embodiments of the present disclosure are not limited thereto.

The conductive material may provide or increase electrode conductivity. Any suitable electrically conductive material may be used as a conductive material unless it causes a chemical change (e.g., an unwanted chemical reaction). Non-limiting examples of the conductive material may include a carbon-based material (such as natural graphite, artificial graphite, carbon black, acetylene black, Ketjenblack®, a carbon fiber, and/or the like); a metal-based material of a metal powder and/or a metal fiber including copper, nickel, aluminum, silver, and/or the like; a conductive polymer (such as a polyphenylene derivative); and mixtures thereof.

The current collector, for example, the positive electrode current collector, may be an aluminum foil, a nickel foil, or a combination thereof, but embodiments of the present disclosure are not limited thereto.

A positive electrode for a rechargeable lithium battery according to one or more embodiments of the present disclosure may include a current collector, a positive active material layer on at least one surface of the current collector, and a functional layer on the positive active material layer. The current collector and the positive active material layer may each be the same as described above.

In some embodiments, the functional layer may include the compound represented by Chemical Formula 3 and a binder. When the functional layer includes the compound represented by Chemical Formula 3, it may reduce exothermic generation of heat by the compound in the positive active material layer, thereby further improving the stability of the rechargeable lithium battery employing the same.

$$Li_{a3}Fe_{1-x3}M3_{x3}PO_4.$$  Chemical Formula 3

In Chemical Formula 3, $0.90 \leq a3 \leq 1.8$, $0 \leq x3 \leq 0.7$, and M3 may be Mg, Co, Ni, or a combination thereof.

In some embodiments, the positive active material layer may be between the current collector and the functional layer. When the functional layer is first formed on the current collector, and the positive active material is on the functional layer, the resistance and output characteristics of the battery may be unfavorably deteriorated because the compound represented by Chemical Formula 3 has low electronic conductivity. In some embodiments, the positive active material layer may have a dense structure, and the functional layer may have a porous structure.

In this case, the compound represented by Chemical Formula 3 may have an average particle diameter of less than or equal to about 2 μm, for example, about 0.2 μm to about 1 μm. When the average particle diameter of the compound represented by Chemical Formula 3 satisfies this range, it may prevent or reduce the electronic conductivity deterioration and may improve a utilizing rate of the compound represented by Chemical Formula 3, and may prevent or reduce an increase in battery resistance. Thus, the cycle-life characteristics of the rechargeable lithium battery employing the positive electrode may be improved.

The term "average particle diameter" of the compound represented by Chemical Formula 3 refers to an average diameter when the compound is circular, or an average of the long diameter when it is oval or amorphous.

The binder may be any suitable binder resistant to oxidation, for example, having an oxidation potential of less than or equal to about 4.45 V (vs. Li+).

The binder may include, for example, a styrene-butadiene rubber, an acrylate-based compound, an imide-based compound, a polyvinylidene fluoride-based compound, a polyvinylpyrrolidone-based compound, a nitrile-based compound, an acetate-based compound, a cellulose-based compound, a cyano-based compound, and/or the like.

Non-limiting examples of the acrylate-based compound may include polyacrylic acid (PAA), polymethylmethacrylate, polyisobutylmethacrylate, polyethylacrylate, polybutylacrylate, poly(2-ethylhexyl acrylate), and a combination thereof.

Non-limiting examples of the imide-based compound may include polyimide, polyamide imide, and a combination thereof. Non-limiting examples of the polyvinylidene fluoride-based compound may include polyvinylidene fluoride-co-hexafluoropropylene, polyvinylidene fluoride-co-trichloroethylene, polyvinylidene fluoride-co-tetrafluoroethylene, polyvinylidene fluoride-co-trifluoroethylene, polyvinylidene fluoride-co-trifluorochloroethylene and polyvinylidene fluoride-co-ethylenefluoride-hexafluoropropylene (PVdF), polyvinylidene fluoride-trichloroethylene, and a combination thereof, and non-limiting examples of the polyvinylpyrrolidone-based compound may include polyvinylpyrrolidone and a combination thereof.

Non-limiting examples of the nitrile-based compound may include polyacrylonitrile, an acrylonitrile-styrene-butadiene copolymer, and a combination thereof, non-limiting examples of the acetate-based compound may include polyvinylacetate, ethylene-co-vinyl acetate, cellulose acetate, cellulose acetate butyrate, cellulose acetate propionate, and a combination thereof, non-limiting examples of the cellulose-based compound may include cyanoethyl cellulose, carboxyl methyl cellulose, and a combination thereof, and non-limiting examples of the cyano-based compound may include cyanoethyl sucrose.

The oxidation-resistant binder may be well bonded with the compound represented by Chemical Formula 3 as well as the first and the second positive active material of the positive active material included in the positive active material layer, and may therefore strongly retain bonding between the functional layer and the positive active material layer.

When using the binder, water and/or alcohols may be used as a solvent for the functional layer. When the solvent includes water and/or alcohols, this may have merits of not damaging the electrode.

The functional layer may have a thickness of about 1 μm to about 13 μm, for example, about 2 μm to about 4 μm. When the thickness of the functional layer is within this range, the safety of the battery may be further enhanced.

An average thickness of the positive active material layer may be about 50 μm to about 70 μm, for example, about 50 μm to about 60 μm, or about 60 μm to about 70 μm. When the thickness of the positive active material layer is within this range, the energy density may be increased, and this thickness may be applied to various suitable kinds or types of batteries according to the aspects of devices to be employed.

The ratio of the positive active material layer thickness to the functional layer thickness may be about 30:1 to about 10:1. When the ratio of the positive active material layer thickness to the functional layer thickness is within this range, the coating layer may improve battery safety while minimizing or reducing a decrease in energy density. For example, when the thickness of the functional layer and the thickness of the positive active material layer are within the above ranges, and when a ratio of the thickness of the positive active material layer to the thickness of the functional layer is within the above range, battery safety may be increased by providing the functional layer with an appropriate or suitable thickness according to the thickness of the positive active material layer.

The thickness of the positive active material layer may refer to the thickness after performing a pressing process during manufacturing a positive electrode.

A mixing ratio of the compound represented by Chemical Formula 3 and the binder may be, for example, a weight ratio of about 24:1 to about 50:1, or a weight ratio of about 43:1 to about 50:1. When the mixing ratio of the compound represented by Chemical Formula 3 and the binder is within this range, it may provide appropriate or suitable energy density, adherence, dispersion, and the like.

In some embodiments, the functional layer may further include a thickener. The thickener may include, for example, at least one of carboxymethyl cellulose, hydroxypropylmethyl cellulose, methyl cellulose, or an alkali metal salt thereof. The alkali metal may be Na, K, or Li. When the functional layer further includes the thickener, an amount of the thickener may be about 0.6 parts by weight to about 2 parts by weight based on 100 parts by weight of the compound of Chemical Formula 3. When the amount of the thickener is within this range, the resistance increase may be minimized or reduced, and the thickening and dispersing properties may also be improved.

The functional layer may include a compound represented by Chemical Formula 3, a binder, and an optional thickener, but does not include a conductive material. When the functional layer includes a conductive material, this may be unfavorable since battery safety may be deteriorated, for example, a short may occur.

In some embodiments, the functional layer may further include polymer particles besides the compound represented by Chemical Formula 3.

The polymer particles may include, for example, polyethylene wax, acryl-based particles having a glass transition temperature ($T_g$) of less than or equal to about 100° C. (for example, less than or equal to about 50° C.), or a combination thereof. The amount of the polymer particles may be about 20 wt % to about 70 wt %, for example, about 20 wt % to about 60 wt %, or about 30 wt % to about 50 wt % based on the total amount of the functional layer. When the amount of the polymer particle satisfies this range, it may further enhance the shut-down function of the rechargeable lithium battery without deteriorating the battery performance.

The polymer particle may have a weight average molecular weight of about 300 to about 10,000.

The polymer particle may have an average particle diameter of about 100 nm to about 5 µm.

The polymer particle may have a weight average molecular weight of about 300 to about 10,000, for example, about 2,000 to about 6,000. The polymer particle may have a diameter of about 100 nm to about 5 µm, for example, about 200 nm to about 3 µm.

When the weight average molecular weight and the average particle diameter of the polymer particle satisfy these ranges, the pores in the internal part of the second positive active material may be prevented or partially prevented from blocking lithium ion transfer, thereby minimizing or reducing resistance. Thus, although the nickel-based lithium composite oxide is employed as a first positive active material, it may significantly improve the stability of a rechargeable lithium battery employing the positive active material according to embodiments of the present disclosure.

As described above, when the functional layer further includes polymer particles, it may further enhance the shut-down function of a rechargeable lithium battery employing the positive electrode according to the present embodiment, so as to quickly suppress heating of the rechargeable lithium battery and to further improve the thermal stability.

A rechargeable lithium battery according to an embodiment of the present disclosure may include a positive electrode, a negative electrode, and an electrolyte solution.

Figure 4:
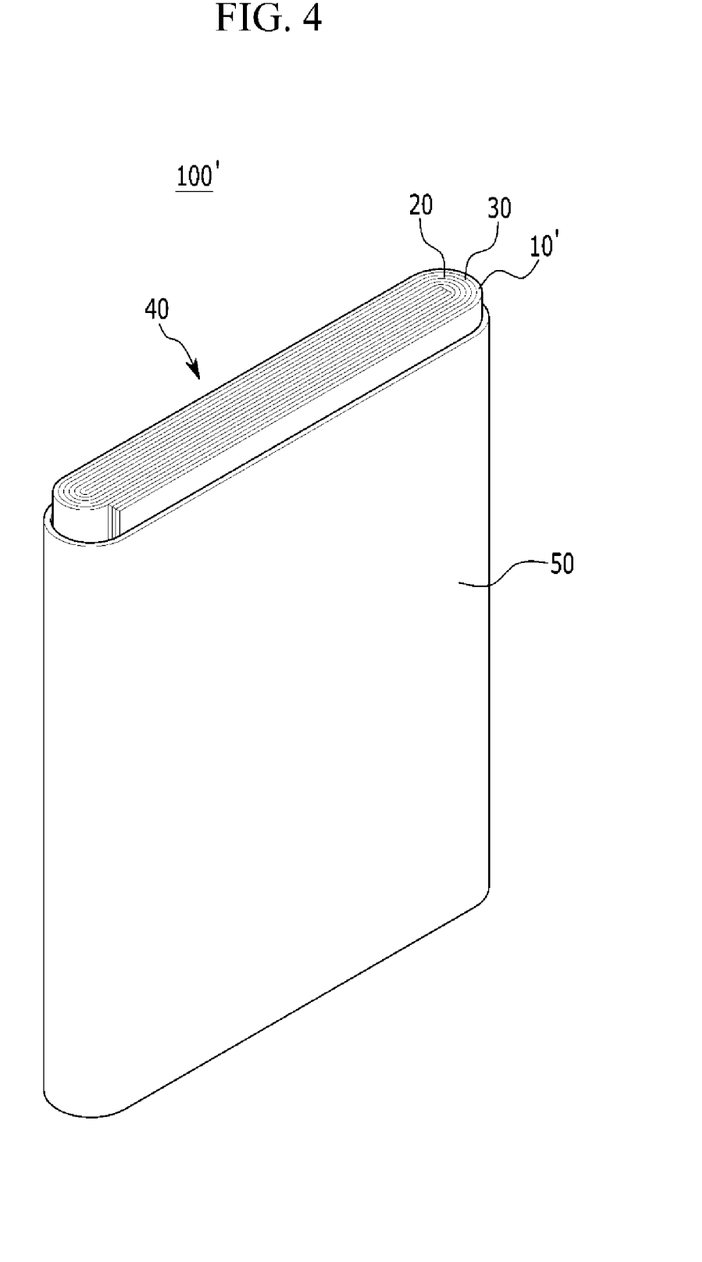
FIG. 4 is a schematic view of a rechargeable lithium battery according to embodiments of the present disclosure.

FIG. 4 is a schematic view of a rechargeable lithium battery according to an embodiment of the present disclosure.

Referring to FIG. 4, a rechargeable lithium battery 100' according to an embodiment includes an electrode assembly 40 manufactured by winding a separator 30 interposed between a positive electrode 10' and a negative electrode 20, and a case 50 housing the electrode assembly 40. An electrolyte solution may be impregnated in the positive electrode 10', the negative electrode 20, and the separator 30.

The positive electrode 10' for a rechargeable lithium battery according to embodiments of the present disclosure may be used as the positive electrode. The positive electrode may be the same as described above.

The negative electrode 20 may include a negative electrode current collector and a negative active material layer positioned on the current collector. The negative active material layer may include a negative active material.

The negative active material may include a material that reversibly intercalates/deintercalates lithium ions, a lithium metal, a lithium metal alloy, a material capable of doping/dedoping lithium, and/or a transition metal oxide.

The material that reversibly intercalates/deintercalates lithium ions may include a carbon material. The carbon material may be any suitable carbon-based negative active material for a rechargeable lithium battery. Non-limiting examples of the carbon-based negative active material may include crystalline carbon, amorphous carbon, and mixtures thereof. The crystalline carbon may be non-shaped (e.g., without a defined shape), and/or sheet, flake, spherical, and/or fiber shaped natural graphite and/or artificial graphite. The amorphous carbon may be a soft carbon, a hard carbon, a mesophase pitch carbonization product, fired coke, and/or the like.

The lithium metal alloy may include an alloy of lithium and a metal, the metal being selected from Na, K, rubidium (Rb), cesium (Cs), francium (Fr), beryllium (Be), Mg, Ca, Sr, Si, antimony (Sb), lead (Pb), indium (In), zinc (Zn), barium (Ba), radium (Ra), germanium (Ge), Al, and tin (Sn).

The material capable of doping/dedoping lithium may be a silicon-based material, for example, Si, $SiO_x$ ($0<x<2$), a Si-Q alloy (wherein Q is an element selected from an alkali metal, an alkaline-earth metal, a Group 13 element, a Group 14 element excluding Si, a Group 15 element, a Group 16 element, a transition metal, a rare earth element, and a combination thereof), a Si-carbon composite, Sn, $SnO_2$, a Sn—R alloy (wherein R is an element selected from an alkali metal, an alkaline-earth metal, a Group 13 element, a Group 14 element excluding Sn, a Group 15 element, a Group 16 element, a transition metal, a rare earth element, and a combination thereof), a Sn-carbon composite, and/or the like. At least one of these materials may be mixed with $SiO_2$. The elements Q and R may be selected from Mg, Ca, Sr, Ba, Ra, scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), Al, gallium (Ga), Sn, indium (In), Ge, phosphorus (P), arsenic (As), Sb, bismuth (Bi), sulfur (S), selenium (Se), tellurium (Te), polonium (Po), and a combination thereof.

The transition metal oxide may include lithium titanium oxide.

In the negative active material layer, the negative active material may be included in an amount of about 95 wt % to about 99 wt % based on the total weight of the negative active material layer.

The negative active material layer may include a negative active material and a binder, and in some embodiments, a conductive material.

In the negative active material layer, the negative active material may be included in an amount of about 95 wt % to about 99 wt % based on the total weight of the negative active material layer. In the negative active material layer, a content of the binder may be about 1 wt % to about 5 wt % based on the total weight of the negative active material layer. When the negative active material layer includes a conductive material, the negative active material layer may include about 90 wt % to about 98 wt % of the negative active material, about 1 wt % to about 5 wt % of the binder, and about 1 wt % to about 5 wt % of the conductive material.

The binder may improve the binding properties of negative active material particles with one another and with a current collector. The binder may include a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and a combination thereof.

The water-soluble binder may be a styrene-butadiene rubber, an acrylated styrene-butadiene rubber, a polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used as a thickener to increase viscosity. The cellulose-based compound may include one or more of carboxymethyl cellulose, hydroxypropylmethyl cellulose, methyl cellulose, and/or alkali metal salts thereof. The alkali metals may be Na, K, and/or Li. The thickener may be included in an amount of about 0.1 to about 3 parts by weight based on 100 parts by weight of the negative active material.

The conductive material may be included to provide or increase the conductivity of the electrode. Any electrically conductive material may be used as a conductive material unless it causes a chemical change (e.g., an unwanted chemical reaction). Non-limiting examples of the conductive material include a carbon-based material (such as natural graphite, artificial graphite, carbon black, acetylene black, Ketjenblack®, Denka Black, carbon fiber, and/or the like); a metal-based material of a metal powder and/or a metal fiber including copper, nickel, aluminum, silver, and/or the like; a conductive polymer (such as a polyphenylene derivative); and mixtures thereof.

The negative current collector may include one selected from a copper foil, a nickel foil, a stainless steel foil, a titanium foil, a nickel foam, a copper foam, a polymer substrate coated with a conductive metal, and a combination thereof.

The electrode assembly, as shown in FIG. 4, may have a structure obtained by interposing a separator 30 between band-shaped positive electrode 10' and negative electrode 20, spirally winding them, and compressing it into a flattened form. In some embodiments, a plurality of quadrangular sheet-shaped positive and negative electrodes may be alternately stacked with a plurality of separator therebetween.

An electrolyte solution may be impregnated in the positive electrode 10', the negative electrode 20, and the separator 30.

The separator 30 may be any suitable separator for a lithium battery that can separate a positive electrode 10' and a negative electrode 20 and provide a transporting passage for lithium ions. For example, the separator may have low resistance to ion transport and excellent impregnation for an electrolyte solution. The separator 30 may be, for example, selected from a glass fiber, polyester, polyethylene, polypropylene, polytetrafluoroethylene, and a combination thereof. It may have a form of a non-woven fabric or a woven fabric. For example, in a rechargeable lithium battery, a polyolefin-based polymer separator (such as polyethylene and polypropylene) may be used. A coated separator including a ceramic component and/or a polymer material may be used to improve heat resistance and/or mechanical strength. In some embodiments, the separator may have a mono-layered or multi-layered structure.

The electrolyte solution may include a non-aqueous organic solvent and a lithium salt.

The non-aqueous organic solvent may serve as a medium for transmitting ions taking part in the electrochemical reaction of a rechargeable lithium battery.

The non-aqueous organic solvent may include a carbonate-based, ester-based, ether-based, ketone-based, alcohol-based, and/or aprotic solvent. The carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and/or the like. The ether based solvent may include dibutyl ether, tetraglyme, diglyme, dimethoxyethane, 2-methyltetrahydrofuran, tetrahydrofuran, and/or the like, and the ketone based solvent may include cyclohexanone and/or the like. The alcohol based solvent may include ethanol, isopropyl alcohol, and/or the like, and the aprotic solvent may include nitriles (such as R—CN, where R is a C2 to C20 linear, branched, or cyclic hydrocarbon group, a double bond, an aromatic ring, or an ether bond), and/or the like, amides (such as dimethyl formamide and/or the like), dioxolanes (such as 1,3-dioxolane and/or the like), sulfolanes, and/or the like.

The non-aqueous organic solvent may be used alone or in a mixture. When the organic solvent is used in a mixture, the mixture ratio may be controlled in accordance with a desirable battery performance.

The carbonate-based solvent may include a mixture of a cyclic carbonate and a linear (chain) carbonate. When the cyclic carbonate and linear carbonate are mixed together in a volume ratio of about 1:1 to about 1:9, an electrolyte performance may be improved.

In some embodiments, the non-aqueous organic solvent of this disclosure may further include an aromatic hydrocarbon-based organic solvent in addition to the carbonate-based solvent. Herein, the carbonate-based solvent and the aromatic hydrocarbon-based organic solvent may be mixed in a volume ratio of about 1:1 to about 30:1.

The aromatic hydrocarbon-based organic solvent may be an aromatic hydrocarbon-based compound of Chemical Formula 4.

Chemical Formula 4

In Chemical Formula 4, $R_1$ to $R_6$ may be the same or different, and may be selected from hydrogen, a halogen, a C1 to C10 alkyl group, a haloalkyl group, and a combination thereof.

Non-limiting examples of the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and mixtures thereof.

In some embodiments, the non-aqueous electrolyte may further include vinylene carbonate and/or an ethylene carbonate-based compound of Chemical Formula 5 in order to improve the battery cycle life.

Chemical Formula 5

In Chemical Formula 5, $R_7$ and $R_8$ may be the same or different and selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and fluorinated C1 to C5 alkyl group, and $R_7$ and $R_8$ are not simultaneously (both) hydrogen.

Non-limiting examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The additive for improving cycle life may be used within an appropriate or suitable range.

The lithium salt is dissolved in an organic solvent, supplies a battery with lithium ions to allow operation of the rechargeable lithium battery, and improves lithium ion transport between positive and negative electrodes. Non-limiting examples of the lithium salt include at least one selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, for example, an integer of 1 to 20), LiCl, LiI, and $LiB(C_2O_4)_2$ (lithium bis-oxalate borate; LiBOB). The lithium salt may be used in a concentration of about 0.1 M to about 2.0 M. When the lithium salt is included at the above concentration range, an electrolyte may have excellent performance and lithium ion mobility due to optimal or suitable electrolyte conductivity and viscosity.

An exterior material may be provided, and may include (e.g., consist of) a lower exterior material and an upper exterior material, and the electrode assembly 40 may be housed in an internal space of the lower exterior material.

After housing (placing) the electrode assembly 40 in the exterior material, a sealant may be applied on a sealing region along the edge of the lower exterior material to seal the upper exterior material and the lower exterior material. Herein, parts where a positive terminal and a negative electrode terminal are in contact with the case may be wrapped with an insulation member to improve durability of the rechargeable lithium battery 100'.

The rechargeable lithium battery according to an embodiment of the present disclosure may be included in a device. Such a device may be for example, one of a mobile phone, a tablet computer, a laptop computer, a power tool, a wearable electronic device, an electric vehicle, a hybrid electric vehicle, a plug-in hybrid electric vehicle, and a power storage device. Such devices using a rechargeable lithium battery are well known in the art and will not be further illustrated.

Hereinafter, the disclosure will be described in additional detail through Examples.

Example 1

(1) Manufacture of Positive Electrode 97.4 wt % of a mixture including a first positive active material and a second positive active material with a $LiFePO_4$ composition having an average particle diameter of 500 nm, mixed at a weight ratio of 9:1; 1.3 wt % of Denka Black; and 1.3 wt % of polyvinylidene fluoride were mixed in a N-methyl pyrrolidone solvent to provide a positive active material slurry.

Here, the first positive active material was a mixture including a large-sized positive active material having a composition of $LiNi_{0.6}Co_{0.2}Mn_{0.2}O_2$ and an average particle diameter of 12 μm, and a small-sized positive active material having a $LiNi_{0.6}Co_{0.2}Mn_{0.2}O_2$ composition and an average particle diameter of 3 μm, mixed at a weight ratio of 7:3.

Next, the positive active material slurry was coated on an aluminum foil current collector and dried. Subsequently, the dried product was pressed to provide a positive active material layer having a thickness of 60 μm based on the cross-section thereof excepting the current collector to provide a positive electrode.

(2) Manufacture of Negative Electrode and Rechargeable Lithium Battery Cell 98 wt % of graphite, 0.8 wt % of carboxymethyl cellulose, and 1.2 wt % of styrene-butadiene rubber were mixed in pure water to provide a negative active material slurry. The negative active material slurry was coated on a Cu foil and dried and pressed to provide a negative electrode.

Using the positive electrode, the negative electrode, and an electrolyte, a rechargeable lithium battery was manufactured according to the general method described herein. The electrolyte was prepared by dissolving 1.0M $LiPF_6$ in a mixed solvent of ethylene carbonate and dimethyl carbonate (50:50 volume ratio).

Example 2

96 wt % of $LiFePO_4$ having an average particle diameter of 400 nm, 2 wt % of a carboxymethyl cellulose thickener, and 2 wt % of an acrylate-based compound binder were mixed in a water solvent to provide a slurry for a functional layer.

The functional layer slurry was coated on the positive active material layer obtained from Example 1 and dried to provide a functional layer having a thickness of 3.5 µm. A positive electrode having a structure in which the current collector, the positive active material layer, and the functional layer were sequentially stacked was thus obtained.

Next, a negative electrode and a rechargeable lithium battery cell were manufactured using substantially the same procedure as in Example 1.

Example 3

A positive electrode was obtained using substantially the same procedure as in Example 2, except that the functional layer slurry was prepared by mixing 48 wt % of $LiFePO_4$ having an average particle diameter of 400 nm, 2 wt % of carboxymethyl cellulose thickener, 48 wt % of PE wax (Mitsui chemical, W401: weight average molecular weight 1000-5000) having a particle diameter of 1 µm, and 2 wt % of an acrylate-based compound binder in a water solvent.

Comparative Example 1

97.4 wt % of a positive active material, 1.3 wt % of Denka Black, and 1.3 wt % of polyvinylidene fluoride were mixed in an N-methyl pyrrolidone solvent to provide a positive active material slurry.

In this case, the positive active material was prepared by mixing a large-sized positive active material having a $LiNi_{0.6}Co_{0.2}Mn_{0.2}O_2$ composition and an average particle diameter of 12 µm, and a small-sized positive active material having a $LiNi_{0.6}Co_{0.2}Mn_{0.2}O_2$ composition and an average particle diameter of 3 µm at a weight ratio of 7:3.

Next, the positive active material slurry was coated on an aluminum foil current collector and dried. Subsequently, the dried product was pressed to provide a positive active material layer having a thickness of 60 µm based on the cross-section thereof (not including the current collector) to provide a positive electrode.

A negative electrode and a rechargeable lithium battery cell were manufactured using substantially the same procedure as in Example 1.

Comparative Example 2

A positive electrode, a negative electrode, and a rechargeable lithium battery cell were manufactured using substantially the same procedure as in Example 1, except that a second positive active material having an average particle diameter of 1 µm was used during preparing the positive active material slurry.

Comparative Example 3

A positive electrode, a negative electrode, and a rechargeable lithium battery cell were manufactured using substantially the same procedure as in Example 1, except that a second positive active material having an average particle diameter of 1 µm was used, and the first positive active material and the second positive active material were mixed at a weight ratio of 89:11 to provide the positive active material slurry.

Experimental Example 1: Evaluation of Specific Capacity

The rechargeable lithium battery cells obtained from Example 1 and Comparative Examples 1 to 3 were performed with (e.g., charged and discharged over) one cycle at room temperature (25° C.) with a current of 0.2 C to measure the specific capacity, and the results are shown in Table 1.

In addition, the charge voltage upper limit was 2V, and the discharge cut-off voltage was 4.3V.

Referring to Table 1, it is confirmed that the rechargeable lithium battery cell according to Example 1 showed limited capacity deterioration, using the rechargeable lithium battery cell according to Comparative Example 1 including no secondary positive active material as a baseline, showing a specific capacity of 184 mAh/g.

However, it is confirmed that the rechargeable lithium battery cells according to Comparative Examples 2 to 3 showed a capacity deterioration of at least 3% or greater.

Experimental Example 2: Measurement of Thermal Stability

Thermal stability was evaluated using differential scanning calorimetry (DSC). The DSC evaluation was carried out using a Q2000 calorimeter (manufactured by TA Instruments) to monitor a calorie change.

The rechargeable lithium battery cells obtained in Examples 1 to 2 and Comparative Example 1 were charged to 100% at a rate of 0.1 C to a voltage limit of 4.3V, and then the battery cell was disassembled to isolate a positive electrode. The separated electrode was washed with DMC (dimethylcarbonate) and then dried for 10 hours or longer, after which the positive active material was peeled off from the current collector, and an electrolyte solution was added to the peeled off active material (mass ratio of positive active material and electrolyte solution=1:2) to perform a DSC evaluation. The DSC scan rate was 5° C./min.

TABLE 1

| | Second positive active material average particle diameter(µm)/amount (wt %) | Specific capacity (mAh/g) | DSC, heating value (J/g) |
|---|---|---|---|
| Example 1 | 0.5/10 | 183.8 | 790.95 |
| Example 2 | 0.5/10 | 183.6 | 755.89 |
| Comparative Example 1 | — | 184 | 1097.6 |
| Comparative Example 2 | 1.0/10 | 179.2 | 843.7 |
| Comparative Example 3 | 1.0/11 | 177.4 | 752.4 |

Referring to Table 1, the rechargeable lithium battery cells according to Examples 1 and 2 including the second positive material having the ranged average particle diameter in the positive active material layer all showed excellent capacity and stability.

In contrast, the rechargeable lithium battery cell according to Comparative Example 1 including no second positive active material in the positive active material layer showed significantly deteriorated stability.

In addition, the capacity was significantly deteriorated in the rechargeable lithium battery cells according to Comparative Examples 2 and 3 including the second positive active material with an average particle diameter outside of the range according to the embodiments of the present disclosure.

Summarizing the results of Examples 1 and 2, it is understood that the rechargeable lithium battery may have excellent stability and also have excellent capacity when the active material layer includes the second positive active material satisfying the conditions according to embodiments of the present disclosure.

Experimental Example 3: Accelerating Rate Calorimetry (ARC) Analysis

The rechargeable lithium battery cells obtained from Examples 1 to 3 and Comparative Example 1 were evaluated using an accelerating rate calorimeter (ARC) according to the following method, and the results are shown in Table 2.

The thermal stability was evaluated under the ARC evaluation conditions of charging the rechargeable lithium battery cells at 25° C. at 0.5 C, resting for 12 hours, and then increasing the temperature to 400° C. at a rate of 5° C./min to measure the battery temperature change.

TABLE 2

| | Self exothermic temperature (° C.) | |
|---|---|---|
| | 1° C./min exothermic onset temperature | 10° C./min thermal runaway onset temperature |
| Example 1 (10% blending) | 157.6 | 200.7 |
| Example 2 (10% blending + LFP coating) | 153.2 | 203.0 |
| Example 3 (PE wax + LFP mixing coating) | 154.5 | 190.0 |
| Comparative Example 1 (NCM622 alone) | 143.1 | 185.4 |

Referring to Table 2, it is confirmed that Examples 1 to 3 showed a higher exothermic onset temperature and (simultaneously) a higher thermal runaway onset temperature than Comparative Example 1.

Thus, as the exothermic onset temperature is high in the cases of Examples 1 to 3, it is confirmed that the rechargeable lithium battery cells according to Examples 1 to 3 showed excellent safety, compared to Comparative Example 1. Furthermore, as Examples 1 to 3 showed a high thermal runaway onset temperature as well, it is confirmed that the exothermic reaction was inhibited enough to provide a rechargeable lithium battery having excellent stability.

Experimental Example 4—Room Temperature Cycle-Life Characteristics

The rechargeable lithium battery cells according to Examples 1 to 2 and Comparative Example 1 were charged and discharged for 100 cycles at room temperature (25° C.) using a constant current-constant voltage program with cut-off conditions of 0.5 C, 4.3V and 0.05 C, resting for 10 minutes, discharging the same at a constant current 0.5 C and a cut-off condition of 2.8V, and resting for 10 minutes, after which the discharge capacity was measured. A ratio of the capacity retention at the 100th cycle with respect to the first discharge capacity was obtained, and the results are shown in Table 3.

TABLE 3

| | 100 cycle (room temperature of 25° C., %) |
|---|---|
| Example 1 (10% blending) | 97.7 |
| Example 2 (10% blending + LFP coating) | 99.8 |
| Comparative Example 1 (NCM622 single) | 97.1 |

Experimental Example 5—High Temperature Cycle-Life Characteristics

The rechargeable lithium battery cells according to Examples 1 to 2 and Comparative Example 1 were charged and discharged for 200 cycles at a high temperature (45° C.) using a constant current-constant voltage charge program with cut-off conditions of 0.75 C, 4.3V and 0.05 C, resting for 10 minutes, and discharging the at a constant current of 0.5 C to a cut-off condition of 2.8V, and resting for 10 minutes, after which a discharge capacity was measured. A capacity retention at the 200th cycle with respect to the first discharge capacity was obtained, and the results are shown in Table 4.

TABLE 4

| | 100 cycle (%) |
|---|---|
| Example 1 (10% blending) | 99.1 |
| Example 2 (10% blending + LFP coating) | 99.7 |
| Comparative Example 1 (NCM622 alone) | 95.4 |

Experimental Example 6—Safety Evaluation 10 rechargeable lithium battery cells according to each of Examples 1 to 3 and Comparative Example 1 were manufactured and subjected to a penetration test.

The penetration test was performed by charging the rechargeable lithium battery cells to 4.25 V at 0.5 C for 3 hours, and after resting for 10 minutes, the central part of the battery cell was penetrated using a pin having a diameter of 3 mm at a speed of 80 mm/sec. The results are shown in Table 5.

TABLE 5

| | Non-ignition | Smoke | Ignition |
|---|---|---|---|
| Example 1 | 10 | — | — |
| Example 2 | 10 | — | — |
| Example 3 | 10 | | |
| Comparative Example 1 | — | — | 10 |

Referring to Table 5, none of the 10 rechargeable lithium battery cells according to Examples 1 to 3 were ignited in the penetration test, but the 10 rechargeable lithium battery cells according to Comparative Example 1 were all ignited, and exploded.

Accordingly, it is confirmed that the rechargeable lithium battery cell employing the positive active material according to the present embodiment showed excellent safety.

As used herein, expressions such as "at least one of", "one of", and "selected from", when preceding a list of elements, modify the entire list of elements and do not modify the individual elements of the list. Further, the use of "may" when describing embodiments of the present disclosure refers to "one or more embodiments of the present disclosure".

In addition, as used herein, the terms "use", "using", and "used" may be considered synonymous with the terms "utilize", "utilizing", and "utilized", respectively.

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims and equivalents thereof. Therefore, the aforementioned embodiments should be understood to be example but not limiting the present disclosure in any way.

DESCRIPTION OF SOME OF THE SYMBOLS

100': rechargeable lithium battery
10': positive electrode
20: negative electrode
30: separator

What is claimed is:

1. A positive active material for a rechargeable lithium battery, comprising:
a first positive active material and a second positive active material mixed together,
wherein the first positive active material is a mixture of a first nickel-based lithium composite oxide and a second nickel-based lithium composite oxide, the first nickel-based lithium composite oxide and the second nickel-based lithium composite oxide having different average particle diameters,
the second positive active material is represented by Chemical Formula 2 and has an average particle diameter of about 300 nm to about 600 nm:

$$Li_{a1}Fe_{1-x1}M1_{x1}PO_4, \quad \text{[Chemical Formula 2]}$$

wherein, in Chemical Formula 2, $0.90 \leq a1 \leq 1.8$, $0 \leq x1 \leq 0.7$, and M1 is magnesium (Mg), cobalt (Co), nickel (Ni), or a combination thereof, an amount of the first positive active material is about 90 wt % to about 98 wt % based on a total amount of the positive active material for a rechargeable lithium battery, and
an amount of the second positive active material is about 2 wt % to about 10 wt % based on a total amount of the positive active material for a rechargeable lithium battery.

2. The positive active material of claim 1, wherein at least one selected from the group consisting of the first nickel-based lithium composite oxide and the second nickel-based lithium composite oxide comprises a compound represented by Chemical Formula 1:

$$Li_{a2}(Ni_{1-x2-y-z}Co_{x2}Me_yM2_z)O_2, \quad \text{[Chemical Formula 1]}$$

wherein, in Chemical Formula 1:
M2 is an element selected from the group consisting of boron (B), magnesium (Mg), calcium (Ca), strontium (Sr), barium (Ba), titanium (Ti), vanadium (V), chromium (Cr), iron (Fe), copper (Cu), and zirconium (Zr),
$0.95 \leq a2 \leq 1.3$, $x2 < (1-x2-y-z)$, $y < (1-x2-y-z)$, $0 < x2 < 1$, $0 \leq y < 1$, $0 \leq z < 1$, and
Me is at least one selected from the group consisting of Mn and Al.

3. The positive active material of claim 1, wherein at least one selected from the group consisting of the first nickel-based lithium composite oxide and the second nickel-based lithium composite oxide is represented by at least one selected from the group consisting of $LiNi_{0.6}Co_{0.2}Mn_{0.2}O_2$, $LiNi_{0.5}Co_{0.2}Mn_{0.3}O_2$, $LiNi_{0.33}Co_{0.33}Mn_{0.33}O_2$, $LiNi_{0.8}Co_{0.1}Mn_{0.1}O_2$, $LiNi_{0.85}Co_{0.1}Al_{0.05}O_2$, and $LiNi_{0.95}Co_{0.025}Al_{0.025}O_2$.

4. A positive electrode for a rechargeable lithium battery, comprising:
a current collector; and
a positive active material layer on at least one surface of the current collector;
wherein the positive active material layer comprises the positive active material for the rechargeable lithium battery of claim 1.

5. A positive electrode for a rechargeable lithium battery, comprising:
a current collector;
a positive active material layer on at least one surface of the current collector; and
a functional layer on the positive active material layer,
wherein the positive active material layer comprises a positive active material comprising:
a first positive active material and a second positive active material,
the first positive active material comprising at least one nickel-based lithium composite oxide, and
the second positive active material being represented by Chemical Formula 2 and having an average particle diameter of about 300 nm to about 600 nm:

$$Fe_{a1}Fe_{1-x1}M1_{x1}PO_4, \quad \text{[Chemical Formula 2]}$$

wherein, in Chemical Formula 2, $0.90 \leq a1 \leq 1.8$, $0 \leq x1 \leq 0.7$, and M1 is magnesium (Mg), cobalt (Co), nickel (Ni), or a combination thereof,
wherein the functional layer comprises a compound represented by Chemical Formula 3 and a binder:

$$Li_{a3}Fe_{1-x3}M3_{x3}PO_4, \quad \text{[Chemical Formula 3]}$$

wherein, in Chemical Formula 3, $0.90 \leq a3 \leq 1.8$, $0 \leq x3 \leq 0.7$, and
M3 is Mg, Co, Ni, or a combination thereof.

6. The positive electrode of claim 5, wherein an average particle diameter of the compound represented by Chemical Formula 3 is about 0.2 μm to about 1 μm.

7. The positive electrode of claim 5, wherein the binder comprises at least one selected from the group consisting of a styrene-butadiene rubber, an acrylate-based compound, an imide-based compound, a polyvinylidene fluoride-based compound, a polyvinylpyrrolidone-based compound, a nitrile-based compound, an acetate-based compound, a cellulose-based compound, and a cyano-based compound.

8. The positive electrode of claim 5, wherein a ratio of a thickness of the positive active material layer to a thickness of the functional layer is about 30:1 to about 10:1.

9. The positive electrode of claim 5, wherein:
the functional layer further comprises polymer particles, and
an amount of the polymer particles is about 20 wt % to about 70 wt % based on a total amount of the functional layer.

10. The positive electrode of claim 9, wherein the polymer particles comprise at least one selected from the group consisting of polyethylene wax, acryl-based particles having a glass transition temperature ($T_g$) of less than or equal to about 100° C., and a combination thereof.

11. A rechargeable lithium battery, comprising:
the positive electrode of claim 4;
a negative electrode; and
an electrolyte solution.

12. The rechargeable lithium battery of claim 11, wherein at least one selected from the group consisting of the first nickel-based lithium composite oxide and the second nickel-based lithium composite oxide comprises a compound represented by Chemical Formula 1:

$$Li_{a2}(Ni_{1-x2-y-z}Co_{x2}Me_yM2_z)O_2, \quad \text{[Chemical Formula 1]}$$

wherein, in Chemical Formula 1:
M2 is an element selected from the group consisting of boron (B), magnesium (Mg), calcium (Ca), strontium (Sr), barium (Ba), titanium (Ti), vanadium (V), chromium (Cr), iron (Fe), copper (Cu), and zirconium (Zr),
$0.95 \leq a2 \leq 1.3$, $x2<(1-x2-y-z)$, $y<(1-x2-y-z)$, $0<x2<0 \leq y<1$, $0 \leq z<1$, and
Me is at least one selected from the group consisting of Mn and Al.

13. The rechargeable lithium battery of claim 11, wherein at least one selected from the group consisting of the first nickel-based lithium composite oxide and the second nickel-based lithium composite oxide is represented by at least one selected from the group consisting of $LiNi_{0.6}Co_{0.2}Mn_{0.2}O_2$, $LiNi_{0.5}Co_{0.2}Mn_{0.3}O_2$, $LiNi_{0.33}Co_{0.33}Mn_{0.33}O_2$, $LiNi_{0.8}Co_{0.1}Mn_{0.1}O_2$, $LiNi_{0.85}Co_{0.1}Al_{0.05}O_2$, and $LiNi_{0.95}Co_{0.025}Al_{0.025}O_2$.

14. The rechargeable lithium battery of claim 11, wherein an amount of the second positive active material is about 1 wt % to about 15 wt % based on a total amount of the positive active material for the rechargeable lithium battery.

15. The rechargeable lithium battery of claim 11, wherein the positive electrode further comprises a functional layer on the positive active material layer,
wherein the functional layer comprises a compound represented by Chemical Formula 3 and a binder:

$$Li_{a3}Fe_{1-x3}M3_{x3}PO_4, \quad \text{[Chemical Formula 3]}$$

wherein, in Chemical Formula 3, $0.90 \leq a3 \leq 1.8$, $0 \leq x3 \leq 0.7$, and
M3 is Mg, Co, Ni, or a combination thereof.

* * * * *